United States Patent [19]
Nishii et al.

[11] Patent Number: 5,635,257
[45] Date of Patent: Jun. 3, 1997

[54] PROCESS FOR HYDROPHILIZING A POROUS MATERIAL MADE OF FLUORINE RESIN

[75] Inventors: Masanobu Nishii, Kyoto; Shunichi Kawanishi, Neyagawa; Shunichi Sugimoto, Hirakata; Tadaharu Tanaka, Neyagawa; Mitsuru Sano, Kashiba, all of Japan

[73] Assignees: Kurashiki Boseki Kabushiki Kaisha, Kurashiki; Japan Atomic Energy, Tokyo-to; Radiation Application Development Reserch Institute, Naga-gun, all of Japan

[21] Appl. No.: 435,975

[22] Filed: May 5, 1995

[30] Foreign Application Priority Data

May 10, 1994 [JP] Japan .................................. 6-96137

[51] Int. Cl.$^6$ .............................. B05D 3/00; B05D 3/06
[52] U.S. Cl. ..................... 427/554; 427/558; 427/581
[58] Field of Search ................................ 427/554, 555, 427/558, 581, 512, 596

[56] References Cited

U.S. PATENT DOCUMENTS

| | | | |
|---|---|---|---|
| 3,632,387 | 1/1972 | Sutherland | 427/322 |
| 4,341,615 | 7/1982 | Bahot et al. | 427/235 |
| 4,853,253 | 8/1989 | Katoh | 427/307 |
| 5,049,275 | 9/1991 | Gillberg-LaForce et al. | 210/500.23 |
| 5,419,968 | 5/1995 | Okada et al. | 427/554 |
| 5,470,617 | 11/1995 | Nishii et al. | 427/558 |

FOREIGN PATENT DOCUMENTS

| | | |
|---|---|---|
| 53-22108 | 7/1978 | Japan . |
| 58-21928 | 5/1983 | Japan . |
| 2-127442 | 5/1990 | Japan . |
| 2-196834 | 8/1990 | Japan . |
| 3-57143 | 8/1991 | Japan . |
| 3-58375 | 9/1991 | Japan . |
| 5-125208 | 5/1993 | Japan . |
| 5-258087 | 10/1993 | Japan . |
| 5-306346 | 11/1993 | Japan . |
| 6-172560 | 6/1994 | Japan . |

OTHER PUBLICATIONS

Translation of JP05-306,346, pub. Nov., 1993 by Okada et al.
Translation of Japanes application #258087/1993 (Oct.).
Translation of Extended Abstract No. 2, 29a-V-5 to 29a-V-7 1993 (Autumn — no month).
The Japan Society of Applied Physics, "The 54th Autumn Meeting, Extended Abstracts", No. 2, p. 608, 1993. Translation, no month.
Kogyo Zairyo, "Engineering Materials", vol. 29 (No. 2), pp. 105–113, 1981. (no month) partial translation only: p. 107, left colm, lines 6–12 considered.
Edward R. Nelson, "Bonding of Teflon", vol. 50, No 3, pp. 329–330, Mar. 1958.

*Primary Examiner*—Marianne Padgett
*Attorney, Agent, or Firm*—Foley & Lardner

[57] ABSTRACT

The present invention relates to a process for hydrophilizing a porous material made of a fluorine resin comprising irradiating an ultraviolet laser beam on the porous material impregnated with an aqueous solution of hydrogen peroxide or water-soluble organic solvent. According to the process, the chemically and physically inactive surfaces including the inside of the micropores of the porous materials made of fluorine resins can be sufficiently hydrophilized without deteriorating the excellent heat resistance, chemical resistance and the like of the fluorine resins.

18 Claims, No Drawings

PROCESS FOR HYDROPHILIZING A POROUS MATERIAL MADE OF FLUORINE RESIN

FIELD OF THE INVENTION

The present invention relates to a process for hydrophilizing a porous material made of fluorine resin which is chemically and physically inactive.

BACKGROUND OF THE INVENTION

Fluorine resins are fit for various uses because they have superior heat resistance, chemical resistance and the like in comparison with other resins. However the fluorine resins have disadvantages of poor adhesion and hydrophilicity, said disadvantages being attributable to the inactive surfaces of the fluorine resins.

Various processes for modifying the surfaces of the fluorine resins have hitherto been proposed. For example, E. R. Nelson et. al. (Ind. Eng. Chem., vol. 50, 1958, pp. 329–330) describe the use of a complex solution prepared from a tetrahydrofuran solution of metallic sodium and naphthalene. In this technique, not only it causes trouble from the viewpoint of working hygiene because the complex solution is unstable and liable to cause ignition during the treatment of the fluorine resins, but also adhesive property and the like of the modified surfaces of the fluorine resins decrease remarkably under the condition of sunlight exposure or high temperature.

Tsunoda et. al. [Kogyo Zairyo (Engineering Materials), vol. 29 (No. 2), 1981, p. 105] describe the use of a glow discharge. In this technique, a modification effect of the surfaces of the fluorine resins is remarkably inferior to that of nonfluorine resins such as polyethylene and the like.

Japanese Patent Publication (KOKOKU) No. 22108/1978 describes the use of a high frequency sputter etching under low pressure. In this method, there are several disadvantages that (i) a treating speed is slow, (ii) resinous residues formed during the sputter etching are deposited to inner parts of an expensive, large-sized treating apparatus with a vacuum system, and (iii) an abrasionable, irregular surfaces of the fluorine resins do not bring about sufficient adhesive properties and application properties of coatings for low fluidable adhesives, coatings and the like.

Japanese Patent Publication(KOKAI) No. 196834/1990 describes the use of laser beam in a special gaseous atmosphere such as $B(CH_3)_3$ and $Al(CH_3)_3$. According to this method, a treating speed is slow, and a strong poisonous gas and an expensive, large-sized treating apparatus are inevitably required.

Japanese Patent Publication (KOKOKU) No. 57143/1991 describes the use of excimer laser beam, said laser beam being directly irradiated to the fluorine resins. According to this technique, adhesive and wetting properties of the surfaces of the fluorine resins cannot sufficiently be improved.

Japanese Patent Publications No. 21928/1983 (KOKOKU), No. 127442/1990 (KOKAI) and No. 58375/1991 (KOKOKU) describe the use of plasma sputter etching at low temperature. In this method, it is difficult to obtain high adhesive strength because of the unchanged chemical composition of the treated surfaces of the fluorine resins. In order to achieve the same higher adhesive strength as that obtained according to the method by Nelson et. al., the surfaces of the fluorine resins must be treated for long-time under the narrow treating condition. Therefore said method is insufficient as an industrial treating technique.

Japanese Patent Publication (KOKAI) No. 125208/1993 discloses the method wherein ultraviolet laser beam is irradiated on the fluorine resins with which light-absorbing materials are kneaded previously. However this method cannot be applied to a surface modification of ready-made molded articles made of fluorine resins because the laser beam must be irradiated after a light-absorbing material is kneaded in the fluorine resins.

Japanese Patent Publication (KOKAI) No. 172560/1994 describes the method wherein an ultraviolet laser beam is irradiated on the fluorine resins in the presence of an inorganic silicon compound. When this method is applied to a modification of porous materials made of fluorine resins, there is a problem that the inorganic silicon compound remains in micropores of the porous materials.

Japanese Patent Application No. 258087/1993 describes the method wherein an aqueous pretreating liquid comprising an ultraviolet-absorbing compound and a fluorosurfactant is adhered on surfaces of molded materials made of fluorine resins, and ultraviolet laser beam is irradiated on the surfaces after drying. According to this method, wettability of the surfaces is not sufficiently improved, although adhesive properties of the surfaces are fairly improved.

Furthermore, the following methods are known: (a) the method wherein ArF excimer laser beam is irradiated on the fluorine resins which are immersed in hydrogen-containing liquid such as water, acids, alcohols and the like (Extended Abstracts No. 2, page 608 (The 54th Autumn Meeting. 1993); The Japan Society of Applied Physics); (b) the method wherein excimer laser beam is irradiated on the fluorine resin films immersed in water or aqueous solution of hydrogen peroxide or floating on said liquid (Japanese Patent Publication (KOKAI) No. 306346/1993). When these methods are applied to a modification of the porous materials, there is a problem that it is difficult to hydrophilize the inside of micropores owing to light scattering and absorption by the immersing liquid. Therefore it is impossible to filter the aqueous solutions of chemicals by means of the porous materials whose surfaces are modified by these methods, e.g. polytetrafluoroethylene film and the like.

SUMMARY OF THE INVENTION

The object of the present invention is to solve the aforesaid problems of the former proposed processes for modifying the surfaces of the fluorine resins, and to provide an improved process for sufficiently hydrophilizing the inside of the micropores of porous material's surfaces made of the fluorine resins.

Accordingly the present invention relates to a process for hydrophilizing a porous material made of a fluorine resin comprising irradiating an ultraviolet laser beam on the porous material impregnated with an aqueous solution of hydrogen peroxide or water-soluble organic solvent.

DETAILED DESCRIPTION OF THE INVENTION

The porous materials made of fluorine resins which may be used in the present invention are any molded porous materials made of fluorine resins having any figures such as films, sheets, pipes, knitted webs, woven or nonwoven fabrics and the like. Following resins are exemplified as a base fluorine resin of the molded porous materials: polytetrafluoroethylene (PTFE), copolymer of tetrafluoroethylene with perfluoroalkoxyethylene (PFA), copolymer of tetrafluoroethylene with hexafluoropropylene (FEP), terpolymer of tetrafluoroethylene with hexafluoropropylene and perfluoroalkoxyethylene (EPE), copolymer of tetrafluoroethylene with ethylene(ETFE), polychlorotrifluoroethylene (PCTFE), copolymer of chlorotrifluoroethylene with ethylene (ECTFE), polyvinylidene fluoride (PVDF), polyvinyl fluoride (PVF), and any mixtures of the aforesaid fluorine resins.

Before irradiation of an ultraviolet laser beam on the surfaces of the porous materials made of fluorine resins, the aqueous solution of hydrogen peroxide or water-soluble organic solvent is impregnated in the surfaces of the porous materials. The following solvents are exemplified as a water-soluble organic solvent which may be used in the present invention: ethers (e.g. tetrahydrofuran, 1,4-dioxane, ethylene glycol monoalkyl ethers, ethylene glycol dialkyl ethers, diethylene glycol monoalkyl ethers, diethylene glycol dialkyl ethers and the like), ketones (e.g. acetone, methyl ethyl ketone, cyclohexanone, diacetylacetone, acetylacetone and the like), alcohols (e.g. methanol, ethanol, propanol, hexyl alcohol, ethylene glycol, isopropyl alcohol, butanol, ethylene chlorohydrin, glycerine and the like), aldehydes (e.g. acetaldehyde, propionaldehyde and the like), amines (e.g. triethylamines, piperidine and the like), ethers (e.g. methyl acetate, ethyl acetate and the like), and so forth.

Generally speaking, when the water-soluble organic solvents having a boiling point of from 50° C. to 150° C. are employed, not only high efficiency of hydrophilizing treatment by the irradiation of an ultraviolet laser beam can be achieved, but also the solvent remained in the porous materials can be removed easily. In the case where the water-soluble organic solvents having a boiling point of less than 50° C. are used, not only air bubbles are generated by the irradiation of an ultraviolet laser beam, but also low efficiency of hydrophilizing treatment can be obtained. If the water-soluble organic solvents having a boiling point of more than 150° C. are employed, removal of the solvents remained in the porous materials becomes difficult.

A concentration of the aqueous solution of hydrogen peroxide or the water-soluble organic solvent is not limited. In order to obtain the high and uniform hydrophilizing effect by the irradiation of an ultraviolet laser beam, however, said concentration is so selected that an absorbance ($\log(\epsilon/\mathrm{mol}^{-1}\mathrm{dm}^3\mathrm{cm}^{-1})$) of said aqueous solution becomes 0.05–5.0, preferably 0.5–1.5 at a wavelength of the ultraviolet laser beam employed. When the absorbance is less than 0.05, sufficient hydrophilizing effect is hard to obtain. If the absorbance is more than 5.0, absorption of light energy by the aqueous solution becomes large, and insufficient hydrophilizing treatment of the inside of the micropores will be achieved.

An impregnation method of the aforesaid aqueous solution in the porous materials made of fluorine resins is not limited, and therefore, immersing, spraying and coating methods and the like may be selected according to the shapes, sizes and the like of the porous materials. In general, however, the immersing method is employed. In the immersing method, it is preferable to substitute said aqueous solution for a water-soluble solvent having low surface tension such as ethanol which is previously impregnated in the porous materials. From the viewpoint of diffusion rate of the aqueous solution into the micropores of the porous materials, it is preferable to carry out the impregnation treatment at 40°–70° C. When the impregnation temperature is lower than 40° C., longer time is required to achieve a sufficient diffusion of the aqueous solution into the micropores of the porous materials. The impregnation temperature of higher than 70° C. is not preferable because a decomposition rate of hydrogen peroxide or evaporation rate of the organic solvents increase.

The porous materials of fluorine resins impregnated with aforesaid aqueous solution are subjected to the following irradiation treatment with an ultraviolet laser beam. It is preferable to employ the ultraviolet laser beam having a wavelength of from 190 nm to 400 nm. As the ultraviolet laser beam, excimer laser beam, argon-ion laser beam, krypton-ion laser beam, $N_2$ laser beam, dye laser beam and the like are exemplified, said excimer laser beam being preferred. In particular, KrF excimer laser beam (wavelength: 248 nm), ArF excimer laser beam (wavelength: 193 nm) and XeCl-excimer laser beam (wavelength: 308 nm) are preferred as they stably supply a high output for a long time. The excimer laser beam may usually be irradiated at room temperature under atmospheric conditions, it is preferable to irradiate the excimer laser beam in an atmosphere of nitrogen. Although the irradiation conditions of the excimer laser beam may be influenced by the kinds of the fluorine resins and the desired modification degree of the porous materials made of fluorine resins, the general irradiation conditions of the excimer laser beam are as follows:

Fluence; more than about 10 $mJ/cm^2/pulse$

Dose; more than about 0.1 $J/cm^2$

The commonly used irradiation conditions of the particularly preferred excimer laser beams (KrF, ArF and XeCl excimer laser beams) are as follows:

KrF excimer laser beam
  Fluence; 100–500 $mJ/cm^2/pulse$
  Dose; 1.0–10.0 $J/cm^2$ ArF excimer laser beam
  Fluence; 25–500 $mJ/cm^2/pulse$
  Dose; 0.1–10.0 $J/cm^2$ XeCl excimer laser beam
  Fluence; 100–600 $mJ/cm^2/pulse$
  Dose; 10.0–100 $J/cm^2$ According to the present invention, the chemically and physically inactive surfaces including the inside of the micropores of the porous materials made of fluorine resins can be sufficiently hydrophilized without deteriorating the excellent heat resistance, chemical resistance and the like of the fluorine resins. Therefore the added values of the porous materials made of fluorine resins increase rapidly, said porous materials being hydrophilized by the present invention.

An economical effect brought about by the hydrophilizing method according to the present invention is significant because only a small amount of metallic components is eluted from the porous materials during said hydrophilizing method and a post-washing of the porous materials treated is not required.

The hydrophilic porous materials prepared by the method according to the present invention are, for example, suitable for filtering an aqueous solution. An addition, the modified porous materials can be expected to use as biomaterials such as a dialysis membrane and the like in the various fields by making the best use of the functional characteristics of said porous materials.

The present invention is illustrated with reference to the following Examples, but it should be understood that the present invention is not construed as being limited thereto.

EXAMPLE 1

The porous film made of PTFE (mean pore size; 0.1 μm, thickness; 0.05 mm) which was previously impregnated with ethanol was immersed in the aqueous solution of hydrogen peroxide or the organic solvents whose concentrations are shown in Table 1. The temperature of the aqueous solution was adjusted to 40° C. After 20 hours, the porous film was drawn up, and the excimer laser beam was irradiated on the porous film under the conditions shown in Table 1.

The irradiated porous film was sufficiently washed with pure water and dried. A wetting property of the porous film was measured with a standard solution for a wetting index prepared according to JIS K-6768 specification. The standard solution consists of a series of mixed solutions whose surface tensions vary successively. The mixed solutions were successively dropped on the porous film in an ascending order of the surface tensions. The wetting index of the porous film was evaluated as the maximum surface tension of the mixed solution which wets the porous film.

The results obtained are shown in Table 1. The wetting indices are remarkably large in comparison with that (less than 31 dyn/cm) of the porous film made of PTFE which was not irradiated with the excimer laser beam.

The fact indicates that the wetting property of the surface of the fluorine resin was improved remarkably by the method according to the present invention.

The surface of the porous film irradiated with the excimer laser beam was analyzed by X-ray photoelectron spectroscopy. The analytic result indicates the formation of polar groups such as carboxyl group and the like. It is thought that the improvement of hydrophilicity of the porous film is attributable to the formation of the polar groups.

According to an electron microscopic analysis, structural damage or deformation of the porous film was not observed.

Comparative Example 1

The procedure was the same as for Example 1, except for impregnating the porous film with water. The result obtained is shown in Table 1.

Comparative Example 2

The porous film made of PTFE (mean pore size; 0.1 µm, thickness; 0.05 mm) which was not impregnated with ethanol was floated on the aqueous solution of hydrogen peroxide (absorbance; 2.5, temperature of the aqueous solution; 40° C.), and ArF excimer laser beam was irradiated above the floated film under the following conditions:

Fluence; 25 mJ/cm$^2$/pulse

Dose; 10 J/cm$^2$

A wetting property of the porous film was measured according to the method described in Example 1. The wetting index of the porous film was less than 31 dyn/cm, said index being attributable to the fact that the aqueous solution of hydrogen peroxide was not impregnated in micropores of the porous material.

Comparative Example 3

The porous film made of PTFE (mean pore size; 0.1 µm, thickness; 0.05 mm) which was not subjected to an ethanol treatment was immersed in the aqueous solution of hydrogen peroxide (absorbance; 2.5) at a depth of one millimeter (temperature of the aqueous solution; 40° C.), and ArF excimer laser beam was irradiated above the immersed film under the following conditions:

Fluence; 25 mJ/cm$^2$/pulse

Dose; 10 J/cm$^2$

A wetting property of the porous film was measured according to the method described in Example 1. The wetting index of the porous film was less than 31 dyn/cm, said index being attributable to the fact that the aqueous solution of hydrogen peroxide was not impregnated in micropores of the porous material.

Comparative Example 4

The porous film made of PTFE (mean pore size; 0.1 µm, thickness; 0.05 mm) which was not subjected to an ethanol treatment was floated on the aqueous solution of hydrogen peroxide (absorbance; 2.5, temperature of the aqueous solution; 40° C.), and KrF excimer laser beam was irradiated above the porous film under the following conditions:

Fluence; 200 mJ/cm$^2$/pulse

Dose; 10 J/cm$^2$

A wetting property of the porous film was measured according to the method described in Example 1. The wetting index of the porous film was less than 31 dyn/cm, said index being attributable to the fact that the aqueous solution of hydrogen peroxide was not impregnated in micropores of the porous material.

Comparative Example 5

The porous film made of PTFE (mean pore size; 0.1 µm, thickness; 0.05 mm) which was not subjected to an ethanol treatment was immersed in the aqueous solution of hydrogen peroxide (absorbance; 2.5) at a depth of one millimeter (temperature of the aqueous solution; 40° C.), and KrF excimer laser beam was irradiated above the immersed film under the following conditions:

Fluence; 200 mJ/cm$^2$/pulse

Dose; 10 J/cm$^2$

A wetting property of the porous film was measured according to the method described in Example 1. The wetting index of the porous film was less than 31 dyn/cm, said index being attributable to the fact that the aqueous solution of hydrogen peroxide was not impregnated in micropores of the porous material.

EXAMPLE 2

The porous film made of PTFE (mean pore size; 0.1 µm, thickness; 0.05 mm) which was previously impregnated with ethanol was immersed in the aqueous solution of hydrogen peroxide (absorbance; 2.5, temperature of the aqueous solution; 40° C.). After 20 hours, the porous film was drawn up, and KrF excimer laser beam was irradiated on the porous film under the following conditions:

Fluence; 200 mJ/cm$^2$/pulse

Dose; 10 J/cm$^2$

A test sample for eluting metal components was prepared by drying the irradiated porous film without washing. The rectangular test sample (8 cm×20 cm) was thrown into a bottle made of polypropylene (50 ml) which contains 30 g of hydrochloric acid (30%). The test sample was immersed in the hydrochloric acid at room temperature for 3 days. Metal components eluted in the hydrochloric acid was measured by means of the furnace atomic absorption spectrometer.

The results obtained are shown in Table 2. As can be seen from Table 2, the amounts of the metal components eluted in the hydrochloric acid are remarkably small in comparison with the results obtained in the following Comparative Example 6. Therefore an economical effect brought about by the above method is significant as a post-washing of the porous material modified is unnecessary.

Comparative Example 6

Under the following conditions, KrF excimer laser beam was irradiated above the porous film made of PTFE (mean pore size; 0.1 μm, thickness; 0.05 mm) which was previously impregnated with the aqueous solution of sodium silicate (absorbance; 2.5):

Fluence; 200 mJ/cm$^2$/pulse

Dose; 10 J/cm$^2$

The irradiated porous film was dried after subjecting to the following successive treatments: (i) an overflow washing in a beaker (300 ml) with 10 liters of ultrapure water, (ii) an immersion washing in a beaker (300 ml) which contains pure water for 72 hours, and (iii) an overflow washing in a beaker (300 ml) with 10 liters of ultrapure water. The dried porous film was used as a test sample for eluting metal components.

The amounts of the eluted metal components were measured according to the method described in Example 2. The results obtained are shown in Table 2.

of hydrogen peroxide or the aqueous solution of the water-soluble Y/rganic liquid at a wavelength of the ultraviolet laser beam employed is 0.05–5.0.

3. A process of claim 1, wherein the ultraviolet laser beam has a wavelength of 190–400 nm.

4. A process of claim 1, wherein the porous material is impregnated with the aqueous solution of hydrogen peroxide.

5. A process of claim 1, wherein the porous material is impregnated with the aqueous solution of the water soluble organic liquid.

6. A process as claimed in claim 2, wherein the value is 0.5 to 1.5.

7. A process as claimed in claim 1, wherein the impregnating of step (ii) comprises immersing the porous material in the aqueous solution.

8. A process as claimed in claim 1, wherein the impregnation of the aqueous solution is carried out at 40°–70° C.

TABLE 1

| Impregnation solution | ArF excimer laser beam (193 nm) 25 mJ/cm$^2$/pulse 10 J/cm$^2$ Absorbance; 2.5*) | | KrF excimer laser beam (248 nm) 200 mJ/cm$^2$/pulse 10 J/cm$^2$ Absorbance; 2.5*) | | XeCl excimer laser beam (308 nm) 420 mJ/cm$^2$/pulse 80 J/cm$^2$ Absorbance; 2.5*) | |
|---|---|---|---|---|---|---|
| | Concentration (wt %) | Wetting index (dyn/cm) | Concentration (wt %) | Wetting index (dyn/cm) | Concentration (wt %) | Wetting index (dyn/cm) |
| aq. sol. of hydrogen peroxide | 0.03 | 52 | 0.3 | 40 | 10 | 33 |
| aq. sol. of 1,4-dioxane | 0.2 | 54 | — | — | — | — |
| aq. sol. of ethylene glycol monomethyl ether | 1.0 | 46 | — | — | — | — |
| aq. sol. of acetylacetone | 0.022 | 48 | 0.043 | 35 | — | — |
| aq. sol. of methyl ethyl ketone | 0.179 | 45 | 1.56 | 33 | — | — |
| aq. sol. of dimethylamine | 0.005 | 45 | — | — | — | — |
| water | — | 31 | — | 31 | — | — |

*)log(ε/mol$^{-1}$ dm$^3$ cm$^{-1}$)

TABLE 2

| Eluted metal components (ng/cm$^3$) | Fe | K | Mn | Na | Ni | Zn | Si |
|---|---|---|---|---|---|---|---|
| Example 2 | 6.2 | N.D.*) | N.D. | 0.3 | N.D. | 0.9 | N.D. |
| Comparative Example 6 | 19 | 1.0 | 0.19 | N.D. | N.D. | 2.6 | 9.0 |
| Limit detection | 0.1 | 0.1 | 0.1 | 0.1 | 0.4 | 0.1 | 1.0 |

*)not detected

What is claimed is:

1. A process for hydrophilizing a porous material made of a fluorine resin comprising (i) impregnating the porous material with ethanol, (ii) impregnating the porous material with an aqueous solution of hydrogen peroxide or an aqueous solution of water-soluble organic liquid selected from the group consisting of 1,4-dioxane, ethylene glycol monomethyl ether, acetylacetone, methyl ethyl ketone, dimethylamine, and mixtures thereof, thereby substituting the ethanol impregnated in the process material with the aqueous solution, and (iii) irradiating an ultraviolet laser beam on the impregnated porous material.

2. A process of claim 1 wherein a value of log (ε/mol$^-$1cm$^3$cm$^{-1}$)(wherein ε is absorbance) of the aqueous solution 9. A process as claimed in claim 1, wherein the irradiating is conducted in an atmosphere of nitrogen.

10. A process as claimed in claim 1, wherein step (ii) the porous material is impregnated with said 1,4-dioxane.

11. A process as claimed in claim 1, wherein step (ii) the porous material is impregnated with said ethylene glycol monomethyl ether.

12. A process as claimed in claim 1, wherein step (ii) the porous material is impregnated with said acetylacetone.

13. A process as claimed in claim 1, wherein step (ii) the porous material is impregnated with said methyl ethyl ketone.

14. A process as claimed in claim 1, wherein step (ii) the porous material is impregnated with said dimethylamine.

15. A process as claimed in claim 1, wherein the fluorine resins comprises polytetrafluoroethylene.

16. A process as claimed in claim 1, further comprising after step (iii) removal of the aqueous solution from the porous material.

17. A process as claimed in claim 1, wherein the laser beam comprises a KrF excimer laser beam, an ArF excimer laser beam, or an XeCl excimer laser beam.

18. A process as claimed in claim 1, wherein the irradiation conditions of the laser beam are a fluence of more than about 10 mJ/cm$_2$ and a dose of more than about 0.1 J/cm$^2$.

* * * * *

UNITED STATES PATENT AND TRADEMARK OFFICE
CERTIFICATE OF CORRECTION

PATENT NO. : 5,635,257
DATED : June 3, 1997
INVENTOR(S) : Masanobu NISHII et al.

It is certified that error appears in the above-identified patent and that said Letters Patent is hereby corrected as shown below:

On the title page [73] Assignees; "Japan Atomic Energy" should read --Japan Atomic Energy Research Institute--; and "Radiation Application Development Research Institute" should read --Radiation Application Development Association--.

Signed and Sealed this

Twenty-eighth Day of September, 1999

Attest:

Q. TODD DICKINSON

*Attesting Officer*       *Acting Commissioner of Patents and Trademarks*